(12) United States Patent
Allen et al.

(10) Patent No.: US 11,366,818 B2
(45) Date of Patent: Jun. 21, 2022

(54) CONTEXT-AWARE DYNAMIC CONTENT ASSIST

(71) Applicant: International Business Machines Corporation, Armonk, NY (US)

(72) Inventors: Corville O Allen, Morrisville, NC (US); Laura Janet Rodriguez, Durham, NC (US); Stephanie Huston, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 307 days.

(21) Appl. No.: 16/691,398

(22) Filed: Nov. 21, 2019

(65) Prior Publication Data

US 2021/0157817 A1 May 27, 2021

(51) Int. Cl.
*G06F 16/24* (2019.01)
*G06F 16/2457* (2019.01)
*H04L 51/046* (2022.01)
*H04L 51/00* (2022.01)
*G06F 40/40* (2020.01)

(52) U.S. Cl.
CPC .. *G06F 16/24578* (2019.01); *G06F 16/24575* (2019.01); *G06F 40/40* (2020.01); *H04L 51/046* (2013.01); *H04L 51/16* (2013.01)

(58) Field of Classification Search
CPC ................ G06F 16/24578; G06F 16/24575
See application file for complete search history.

(56) References Cited

U.S. PATENT DOCUMENTS

| 7,783,777 | B1* | 8/2010 | Pabla ................ G06F 16/1834 |
| | | | 709/239 |
| 7,865,562 | B2 | 1/2011 | Nesbitt et al. |
| 9,444,776 | B2 | 9/2016 | Albouyeh et al. |
| 9,544,746 | B2 | 1/2017 | Lynn et al. |
| 10,235,372 | B1* | 3/2019 | Kesarwani ............ G06F 16/137 |
| 2002/0178228 | A1 | 11/2002 | Goldberg et al. |
| 2007/0260584 | A1* | 11/2007 | Marti .................... G06F 16/258 |
| 2007/0271340 | A1 | 11/2007 | Goodman et al. |

(Continued)

OTHER PUBLICATIONS

IBM, "System and Method for Dynamic Email Signatures based on Communication History and Social Network Characteristics." IP.com Disclosure No. IPCOM000176624D, Original Publication Date: Nov. 19, 2008.

(Continued)

*Primary Examiner* — Eliyah S. Harper
(74) *Attorney, Agent, or Firm* — Patterson + Sheridan, LLP (57) ABSTRACT

Techniques for content augmentation and assist are provided. A textual conversation between a first user and a plurality of recipients is analyzed to determine a first intent of the first user. A set of relationships is determined between the first user and the plurality of recipients, and a set of historical intents corresponding to each of the plurality of recipients is evaluated to identify similar intents to the first intent. A plurality of predefined messages is identified based on one or more similar intents that overlap between two or more of the plurality of recipients. A first predefined message is selected, from the plurality of predefined messages, based on the first intent and the determined set of relationships, and suggested content is provided based on the first predefined message.

20 Claims, 5 Drawing Sheets

(56) References Cited

U.S. PATENT DOCUMENTS

| | | | |
|---|---|---|---|
| 2009/0029687 A1* | 1/2009 | Ramer | G06Q 30/06 |
| | | | 455/414.3 |
| 2009/0177745 A1 | 7/2009 | Davis et al. | |
| 2010/0131523 A1 | 5/2010 | Yu et al. | |
| 2010/0309911 A1* | 12/2010 | Eshwar | G06F 16/2379 |
| | | | 370/390 |
| 2011/0087969 A1 | 4/2011 | Hein et al. | |
| 2011/0173238 A1* | 7/2011 | Griggs | G06F 16/26 |
| | | | 715/781 |
| 2017/0039272 A1 | 2/2017 | Roseman et al. | |
| 2017/0285881 A1 | 10/2017 | Crusson et al. | |
| 2017/0302716 A1 | 10/2017 | Stiers | |
| 2018/0040020 A1* | 2/2018 | Kurian | G06Q 30/0251 |
| 2018/0285432 A1* | 10/2018 | Das | G06N 20/00 |
| 2018/0322213 A1* | 11/2018 | Brown | H04W 4/14 |
| 2020/0226214 A1* | 7/2020 | Reddekopp | G06F 16/1734 |
| 2020/0380389 A1* | 12/2020 | Eldeeb | G06N 20/00 |

OTHER PUBLICATIONS

C. Van Gysel et al., "Reply With: Proactive Recommendation of Email Attachments." In Proceedings of the 2017 ACM on Conference on Information and Knowledge Management (CIKM '17). ACM, New York, 327-336, 2017.
Paul-Valentin Borza, "How To Create A Dynamic Email Signature," Channel 9, Oct. 31, 2006, 30 pages.

\* cited by examiner

CONTEXT-AWARE DYNAMIC CONTENT ASSIST

BACKGROUND

The present disclosure relates to context analysis, and more specifically, to dynamically generating personalized content recommendations.

In many messaging systems, users can include content related to the message they are composing. For example, a user may insert pictures, videos, files, meeting invitations, and the like into their messages. In existing systems, users must explicitly identify the content and manually find the data they want to include (e.g., by searching the Internet or their local computer). The user can then attach or otherwise include the data in the conversation. However, this manual retrieval process is tedious, and it is common to be unable to locate the desired content in a timely manner, or even at all.

SUMMARY

According to one embodiment of the present disclosure, a method is provided. The method includes analyzing a textual conversation between a first user and a plurality of recipients to determine a first intent of the first user, and determining a set of relationships between the first user and the plurality of recipients. The method further includes evaluating a set of historical intents corresponding to each of the plurality of recipients to identify similar intents to the first intent, and identifying a plurality of predefined messages based on one or more similar intents that overlap between two or more of the plurality of recipients. Additionally, the method includes selecting a first predefined message, from the plurality of predefined messages, based on the first intent and the determined set of relationships, and providing suggested content based on the first predefined message.

According to a second embodiment of the present disclosure, a computer-readable storage medium is provided. The computer-readable storage medium contains computer program code that, when executed by operation of one or more computer processors, performs an operation. The operation includes analyzing a textual conversation between a first user and a plurality of recipients to determine a first intent of the first user, and determining a set of relationships between the first user and the plurality of recipients. The operation further includes evaluating a set of historical intents corresponding to each of the plurality of recipients to identify similar intents to the first intent, and identifying a plurality of predefined messages based on one or more similar intents that overlap between two or more of the plurality of recipients. Additionally, the operation includes selecting a first predefined message, from the plurality of predefined messages, based on the first intent and the determined set of relationships, and providing suggested content based on the first predefined message.

According to a third embodiment of the present disclosure, a system is provided. The system includes one or more computer processors, and a memory containing a program which, when executed by the one or more computer processors, performs an operation. The operation includes analyzing a textual conversation between a first user and a plurality of recipients to determine a first intent of the first user, and determining a set of relationships between the first user and the plurality of recipients. The operation further includes evaluating a set of historical intents corresponding to each of the plurality of recipients to identify similar intents to the first intent, and identifying a plurality of predefined messages based on one or more similar intents that overlap between two or more of the plurality of recipients. Additionally, the operation includes selecting a first predefined message, from the plurality of predefined messages, based on the first intent and the determined set of relationships, and providing suggested content based on the first predefined message.

DETAILED DESCRIPTION

Embodiments of the present disclosure provide techniques for dynamic and situation/context aware content augmentation via deep analysis of a variety of data such as the relationship(s) among the users in a conversation, the history of their conversations and interactions, the content and tone of the messages, the users' activity across platforms, and the like. In some embodiments, the system aggregates previous content suggestions to aid future decision making. The analysis can include consideration of messages from any number of communication platforms (such as email, text messages, instant messages, and the like), and the augmented content can be provided from any tool (such as blogs, files, websites, calendars, contacts, and the like). In embodiments, the system analyzes the intent of the user's message(s) to identify appropriate content suggestions.

In some embodiments, the system further generates augmentations based on the recipient user(s) and the relationship(s) between the users. As an example, suppose the user is talking about a project with the design manager. In an embodiment, the system may augment the message(s) with indications of known issues that are currently being tracked. Similarly, if the user is discussing the project with the developer, the system may include a page or website with design specifications. If the user is talking about the project to an operations manager outside of the user's organization, the system can identify and retrieve non-confidential file(s). When talking to a design peer about the project, the system may evaluate the users' calendars to suggest date(s) and time(s) they can meet.

In one embodiment, as users interact, information in the threads, texts, and/or messages can be evaluated for intent, and cataloged/indexed based on the participants, platform on which the action occurred, intent, and the like. In some embodiments, the index includes the identified intent(s), identities of the participants, a few key words, and the like.

This can facilitate fast and inexpensive searching and querying of historical intents. In at least one embodiment, the index does not include the original text itself, or the content that was selected to be included. In one such embodiment, the index includes a link to the selected content. Additionally, in some embodiments, the original text is stored in a separate secure repository. The index can include a link to the original text in that secure repository.

Figure 1:
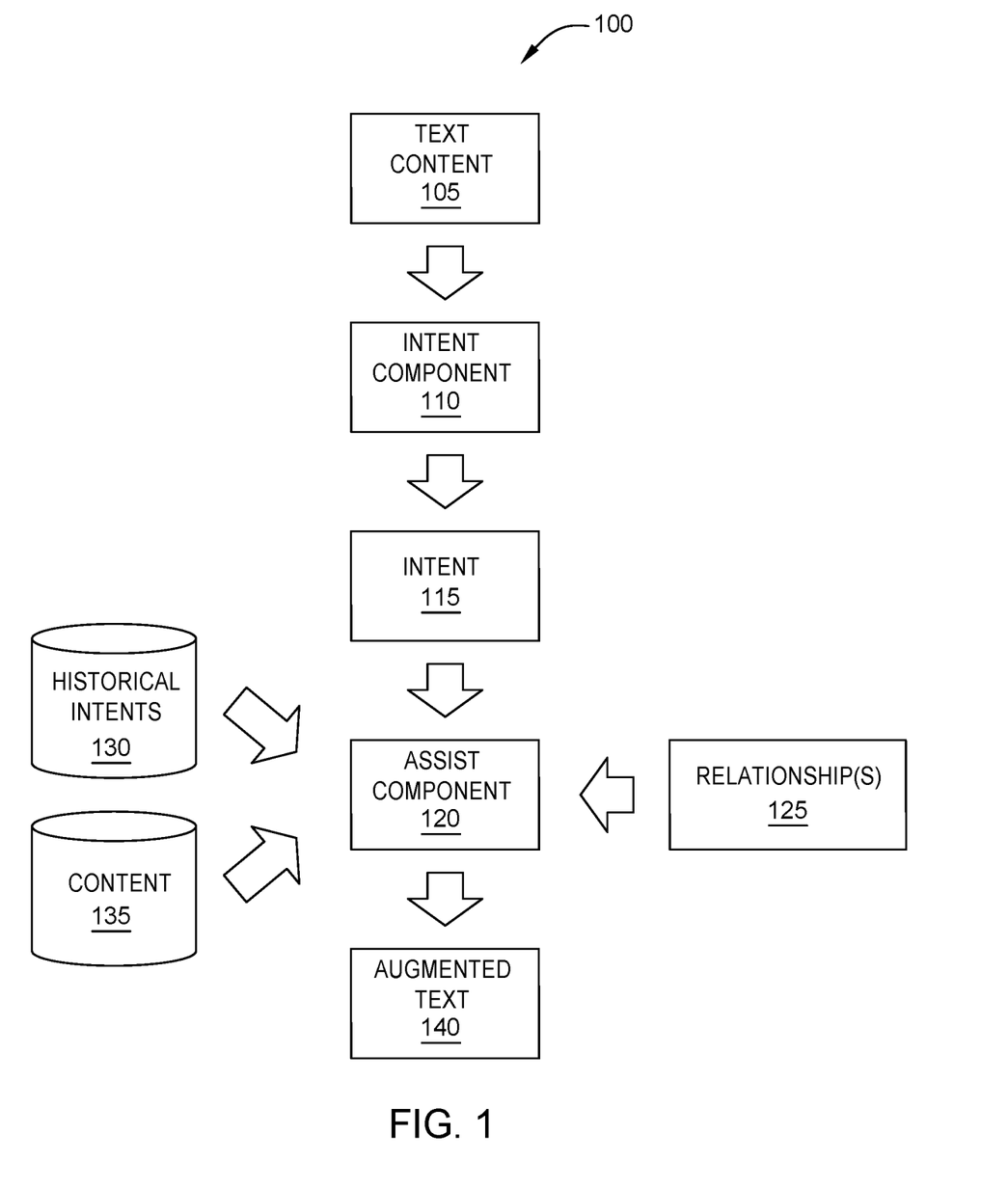
FIG. 1 illustrates a workflow for dynamically generating augmented text using content recommendations, according to one embodiment disclosed herein.

FIG. 1 illustrates a workflow 100 for dynamically generating augmented text using content recommendations, according to one embodiment disclosed herein. In the illustrated embodiment, Text Content 105 is received from a user. In an embodiment, the Text Content 105 includes text (e.g., one or more strings) that is part of a conversation between two or more users. The Text Content 105 may include one or more of the most recent messages or transmissions, or a portion of the most recent message (e.g., the last sentence or paragraph). In some embodiments, the system continuously receives Text Content 105 as the conversation proceeds. In other embodiments, the user can decide to trigger the workflow 100 by providing the Text Content 105 (e.g., by clicking a button before transmitting the message).

As illustrated, the Text Content 105 is provided to an Intent Component 110, which determines one or more Intents 115 of the user that typed/prepared the Text Content 105. The Intent Component 110 can do so by applying one or more natural language processing (NLP) techniques. For example, in one embodiment, the Intent Component 110 utilizes natural language understanding (NLU), intent classification for one or more domains, and the like in order to determine the user's Intent 115. In some embodiments, the Intent Component 110 identifies a single Intent 115 for the Text Content 105 (e.g., by scoring potential Intents 115 and selecting the highest-scored). In another embodiment, the Intent Component 110 can return multiple Intents 115.

The Intent 115 is then provided to an Assist Component 120. The Assist Component 120 uses the Intent 115 (along with other data, in some embodiments) to generate Augmented Text 140 (e.g., the Text Content 105, augmented with additional data or content). In some embodiments, the Assist Component 120 determines a type of content assist, based on the Intent 115. In one embodiment, the Assist Component 120 can use predefined correlations or associations between Intents 115 and types of assist. For example, a □contact me□Intent 115 may correspond to a type of content assist that includes contact information, while a □meet me□intent is associated with a calendar type and a □find my documents□intent is associated with a document retrieval type of assist.

In some embodiments, each type of content assist includes one or more predefined strings with placeholders for the content. For example, the contact type can include a string such as □I can be reached by phone at XXXX, or email at YYYY, □where XXXX and YYYY are placeholders. The Assist Component 120 can then generate Augmented Text 140 by retrieving the appropriate content (e.g., a phone number and an email address), inserting it into the string, and appending the string to the Text Content 105.

In the illustrated embodiment, prior to generating the Augmented Text 140, the Assist Component 120 identifies the participants in the conversation, and determines the Relationship(s) 125 between the participants. The Relationships 125 generally describe the associations and/or hierarchy between users. In one embodiment, the Assist Component 120 determines the Relationship(s) 125 using predefined associations between the users (e.g., in a corporate hierarchy, using social media connections, and the like), based on descriptions of the users (e.g., job descriptions, titles, organizations, and the like), or any other suitable technique.

In an embodiment, the Assist Component 120 additionally receives a set of Historical Intents 130. In one embodiment, the Historical Intents 130 correspond to previously-indexed content assist events. For example, as discussed above, each Historical Intent 130 can include an indication of the participants in the prior conversation, the identified intent that triggered the augmentation, the content that was provided, and the like. In the illustrated embodiment, the Assist Component 120 mines the Historical Intents 130 to determine action(s) it can take.

In one embodiment, the Assist Component 120 does so by, for each identified participant, finding a set of Historical Intents 130 that involve the participant and match, or are similar to, the currently-identified Intent 115. For example, for each participant, the Assist Component 120 may identify Historical Intents 130 where the selected participant was the originating user, and evaluate each such Historical Intent 130 to determine whether it matches the Intent 115 (or, in some embodiments, has a predefined association or relationship with the Intent 115). In one embodiment, the Assist Component 120 similarly retrieves the similar Historical Intents 130 where the selected participant was a recipient of the intent.

In an embodiment, the Assist Component 120 can then identify a subset of the similar Historical Intents 130 that overlap between two or more of the current participants. That is, the Assist Component 120 identifies Historical Intents 130 where at least two of the current participants were also participants during the Historical intent 130. For example, if users A and B were participants in a given Historical Intent 130, the Assist Component 120 can determine that the Historical Intent 130 is relevant if the current conversation includes A and B, but not if it includes only A or only B.

In embodiments, once this subset of overlapping and similar Historical Intents 130 is discovered, the Assist Component 120 can proceed in a variety of ways to identify the appropriate Content 135 to use when generating the Augmented Text 140. The Content 135 can include any data, such as calendar appointments or availability, contact information, and the like. In one embodiment, for each of the Historical Intents 130 in the subset, the Assist Component 120 finds, based on an activity type in the platform, the set of most relevant matches that satisfy the intent. For example, in one embodiment, the Assist Component 120 can perform a lookup of the intent and the activity type within a database, and return the highest matching message type to be used to generate the content assist response. One example of such a lookup is depicted in Table 1, below. Using content such as Table 1, the Assist Component 120 can identify, based on the message type, other messages of the same type, which include or point to predefined text with placeholders.

TABLE 1

| MatchID | Activity Type | Intent Category | Weighted Relevance | Platform Type | Message Type |
| --- | --- | --- | --- | --- | --- |
| A1 | Slack | Find Document | 0.93 | Collaboration | DocumentLink |
| A2 | Email | Contact Me | 0.95 | Email | Contact |
| A3 | Wiki | Find Document | 0.84 | Knowledge Base | DocumentLink |
| A4 | Slack | Contact Me | 0.20 | Collaboration | Contact |
| A5 | GitHub | Code Issues | 0.97 | Source Control | ProjectLink |
| A6 | Email | Schedule Meeting | 0.80 | Email | CalendarInvite |
| A7 | Box | Share Document | 0.88 | Content Sharing | DocumentLink |

Using Table 1 as a reference example, in an embodiment, an activity type of ☐email☐performed on the platform ☐Email, ☐with the identified intent being that one of the recipients to receive contact information. This leads to an intent classification of ☐contact me☐, which results in the Assist Component 120 searching a database table (e.g., Table 1) consisting of activity type and intent mapping to identify the highest relevant message type ☐Contact.☐ This can then be used to find the message(s) for ☐contact☐that align with the relevant fields across intent, recipient, platform, and/or message type. The identified message(s) can then be used by the Assist Component 120 to produce the augmented text. Continuing the above example, the message type ☐Contact☐may have several entries that can be placeholders with replacement texts depending on the relevant fields. A few examples, the entries can include text such as ☐Please send me an email at janedoe@example.com, ☐ or ☐Contact me at the digital office, at digitaloff@example.com, ☐ where the contact will use email because it is the platform currently being used. As another example, consider an intent of ☐find document, ☐ which is performed in a knowledge base platform such as a Wiki. Through the look up and search in the database table, the system can find a highly relevant message type to provide a ☐documentlink, ☐ and this message can be augmented to include a link to a subsequent wiki page sticking to the platform, provided as a wiki link and/or URL included in the message as a placeholder. In one embodiment, the type of content assists can fall into the providing a link (URL), information, contact information, a calendar entry, an embedded experience (weather script), and the like, as well as text with one or more placeholders that are changed and suggested during the content replacement.

In another embodiment, the Assist Component 120 can identify the method(s) that were previously used to communicate context via text similarity and/or activity type in the platform. In such an embodiment the text used to identify the intent (e.g., from the user), can be used to do a text similarity search of the Historical Intents 130 and/or Content 135 to find the next mined response message type. When the text similarity results are over a designated threshold, the system can treat it as match and then use the associated message type and message content for an augmented response, with placeholders based on entity types or pattern matching. This may include, for example, replacing proper names with recipients, pattern matching by replacing emails with the user email, and the like.

In the illustrated embodiment, the Assist Component 120 can utilize the Text Content 105 (and any other context, such as other text from the conversation) to identify the appropriate Content 135. In one embodiment, the Assist Component 120 may search the available Content 135 based on the Intent 115, other context, and/or the type of desired content (e.g., indicated by the determined assist type) to retrieve Content 135. For example, for source code tools, the Assist Component 120 can return a link to the most relevant trunk or repository. Similarly, for calendar entries/activities, the Assist Component 120 can link to the appropriate calendar. Additionally, for documents, the Assist Component 120 may return the most relevant document location. For conversations, the Assist Component 120 can use the conversation identifier or some other way to identify individual conversations.

In an embodiment, the Assist Component 120 uses the selected Content 135 to generate and return the Augmented Text 140. In one embodiment, the Assist Component 120 automatically injects or appends the augmentation and transmits the Augmented Text 140 to the recipient(s). In another embodiment, the Assist Component 120 adds the augmentations and allows the user to decide whether to transmit it. In still another embodiment, the Assist Component 120 can provide a set of options for the user (e.g., including different Content 135, using different assist types/intents, and the like). The user can then select and apply one of the suggestions. In at least one embodiment, the Assist Component 120 can then store a record of the assist in the Historical Intends 130, as discussed above. This allows the system to learn and aid users over time.

Figure 2:
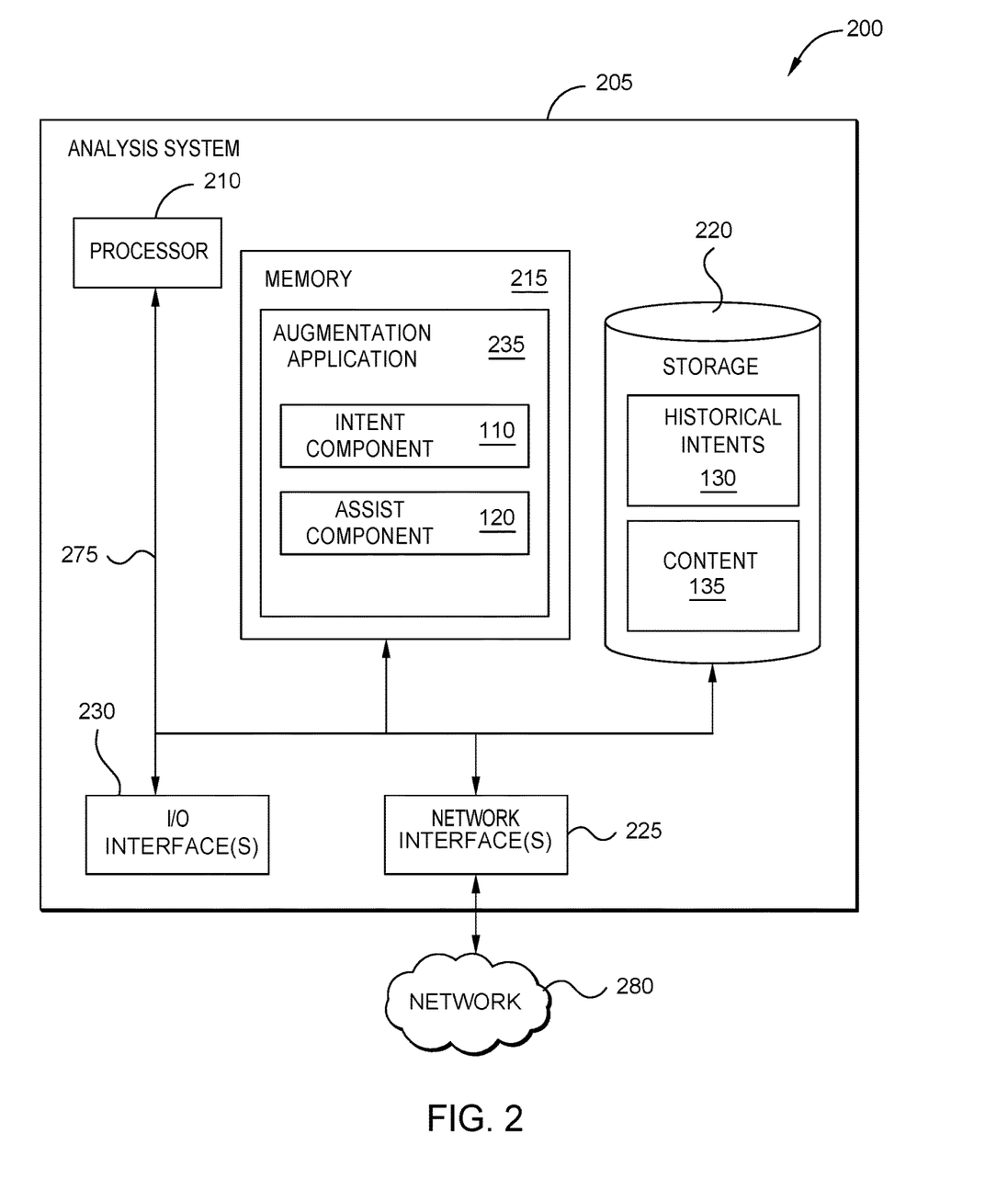
FIG. 2 is a block diagram illustrating an analysis system configured to evaluate text and generate content recommendations, according to one embodiment disclosed herein.

FIG. 2 is a block diagram illustrating an Analysis System 205 configured to evaluate text and generate content recommendations, according to one embodiment disclosed herein. Although depicted as a physical device, in embodiments, the Analysis System 205 may be implemented using virtual device(s), and/or across a number of devices (e.g., in a cloud environment). As illustrated, the Analysis System 205 includes a Processor 210, Memory 215, Storage 220, a Network Interface 225, and one or more I/O Interfaces 230. In the illustrated embodiment, the Processor 210 retrieves and executes programming instructions stored in Memory 215, as well as stores and retrieves application data residing in Storage 220. The Processor 210 is generally representative of a single CPU and/or GPU, multiple CPUs and/or GPUs, a single CPU and/or GPU having multiple processing cores, and the like. The Memory 215 is generally included to be representative of a random access memory. Storage 220 may be any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, input and output devices (such as keyboards, monitors, etc.) are connected via the I/O Interface(s) 230. Further, via the Network Interface 225, the Analysis System 205 can be communicatively coupled with one or more other devices and components (e.g., via the Network 280, which may include the Internet, local network(s), and the like). As illustrated, the Processor 210, Memory

215, Storage 220, Network Interface(s) 225, and I/O Interface(s) 230 are communicatively coupled by one or more Buses 275.

As illustrated, the Storage 220 includes a set of Historical Intents 130, as well as Content 135. Although depicted as residing in Storage 220, in embodiments, the Historical Intents 130 may be stored in any suitable location. Similarly, the Content 135 can reside in any location distributed across any number of devices. In an embodiment, as discussed above, the Historical Intents 130 are records of previous content assists. Each Historical Intent 130 can include, for example, an indication of the participants in the prior conversation at the time of the assist, an indication of the determined intent that triggered the assist, an indication of the content that was provided, and the like. In some embodiments, the Historical Intents 130 further include one or more keywords (e.g., extracted from the content and/or from the conversation). In at least one embodiment, a Historical Intent 130 can additionally include a link or pointer to a location where the full text of the conversation (or a portion of the conversation) can be found (e.g., in a secure repository).

In one embodiment, each time the Analysis System 205 augments a conversation (e.g., each time content is inserted or attached to a conversation or message, either automatically or by user request), the Analysis System 205 creates and stores a corresponding intent record (e.g., in the Historical Intents 130) for future use. In some embodiments, when augmenting new text, the Analysis System 205 relies on the Historical Intents 130 to select an assist type, and/or to select the content itself. In at least one embodiment, the Analysis System 205 can weight more recent Historical Intents 130 more heavily (e.g., based on a timestamp associated with each instance/record of a Historical Intent 130). Similarly, in at least one embodiment, each Historical Intent 130 indicates the platform the assist occurred on (e.g., email, text, instant messaging, and the like), and the Analysis System 205 weights prior intents more heavily if they occurred on the same platform as the current conversation.

In embodiments, the Content 135 generally includes any data that can be used to augment the conversation, such as calendar availability and events, prior conversations, files, documents, images, videos, audio, websites, excerpts from any data, and the like. In the illustrated embodiment, the Memory 215 includes an Augmentation Application 235. Although depicted as software residing in Memory 215, in embodiments, the functionality of the Augmentation Application 235 can be implemented using software, hardware or a combination of software and hardware. The Augmentation Application 235 includes an Intent Component 110 and an Assist Component 120. Although depicted as discrete components for conceptual clarity, in embodiments, the operations of the Intent Component 110 and Assist Component 120 can be combined or divided across any number of components.

As discussed above, the Intent Component 110 generally receives textual input (e.g., all or a portion of a conversation), and performs intent analysis (e.g., using NLU) to identify one or more intents of the originating user (e.g., the user typing or otherwise preparing a message). In various embodiments, the conversation may be textual, visual, and/or via audio. In one embodiment, if the conversation includes audio components, the Intent Component 110 or another preprocessing component can apply speech-to-text techniques prior to processing the data. In embodiments, as discussed above, the Assist Component 120 generally analyzes the determined intent, the relationship(s) among the conversation participants, and/or Historical Intents 130 to suggest assists or augmentations that include additional Content 135.

Figure 3:
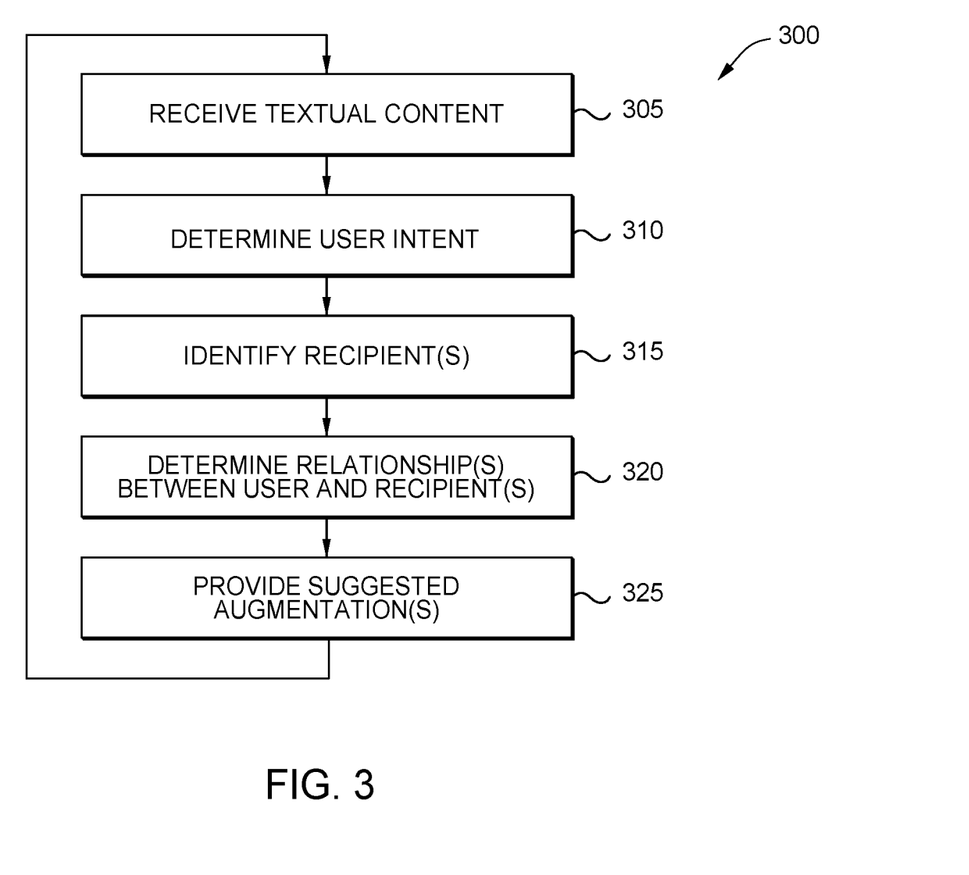
FIG. 3 is a flow diagram illustrating a method for generating and providing content recommendations based on user intent, according to one embodiment disclosed herein.

FIG. 3 is a flow diagram illustrating a method 300 for generating and providing content recommendations based on user intent, according to one embodiment disclosed herein. The method 300 begins at block 305, where an Augmentation Application 235 receives textual content. In an embodiment, the textual content corresponds to all or a portion of a conversation between two or more participants. For example, the textual content may correspond to the most recent message or transmission from a participant. In another embodiment, the textual content is all or a portion of a message that is being prepared or drafted but has not yet been transmitted.

The method 300 then continues to block 310 where the Augmentation Application 235 determines the intent of the user that sent or drafted the textual content. In embodiments, this may include applying any number of NLP techniques, such as NLU, intent classification, keyword recognition, and the like. The method 300 then proceeds to block 315, where the Augmentation Application 235 identifies the recipient(s) of the textual content (or, in the case of an unsent draft, the intended or predicted recipient(s)). At block 320, the Augmentation Application 235 determines the relationship(s) among the participants, and/or among the originating user. In some embodiments, the Augmentation Application 235 evaluates only the relationship(s) between the originating user and each respective recipient. In another embodiment, the Augmentation Application 235 can further evaluate the relationships(s) among the recipients.

In one embodiment, determining the relationships can include evaluating a predefined hierarchy or set of relationships between the participants. For example, the Augmentation Application 235 may refer to a user network that defines the various relationships among any number of users. In another embodiment, the Augmentation Application 235 evaluates descriptions, characteristics, or other parameters of each participant to infer relationships. For example, the Augmentation Application 235 may identify the employer of each (e.g., to determine whether they are colleagues and/or coworkers), the job title of each, and the like.

In some embodiments, the Augmentation Application 235 generates content augmentations based at least in part on the relationships among the users. In one embodiment, the Augmentation Application 235 does so using predefined correlations or associations between relationships and types of assist. For example, if the relationship is between two or more developers on a project, the Augmentation Application 235 may select content relating to the ongoing development of the project. In contrast, if the relationship indicates that a developer is speaking with a manager, the Augmentation Application 235 may select more high-level documentation.

At block 325, the Augmentation Application 235 generates and provides one or more suggested augmentations based on the user intent and relationships between the participants. In one embodiment, the Augmentation Application 235 selects a type of content assist (e.g., indicating the type of content that will be suggested) based on the determined user intent. This is accomplished in some embodiments using predefined associations or correlations between intent (e.g., requesting information) and type (e.g., a copy of a document, or a link to one). The Augmentation Application 235 can then identify the specific content to be included based on the context of the textual content.

For example, in one embodiment, the Augmentation Application 235 can identify, from the textual content itself, what content should be included. In another embodiment, the Augmentation Application 235 can refer to other text in the conversation (e.g., the immediately prior message(s)) to identify appropriate content. After providing the augmentations, the method 300 then returns to block 305, and continues to iterate and provide content as the users interact.

Figure 4:
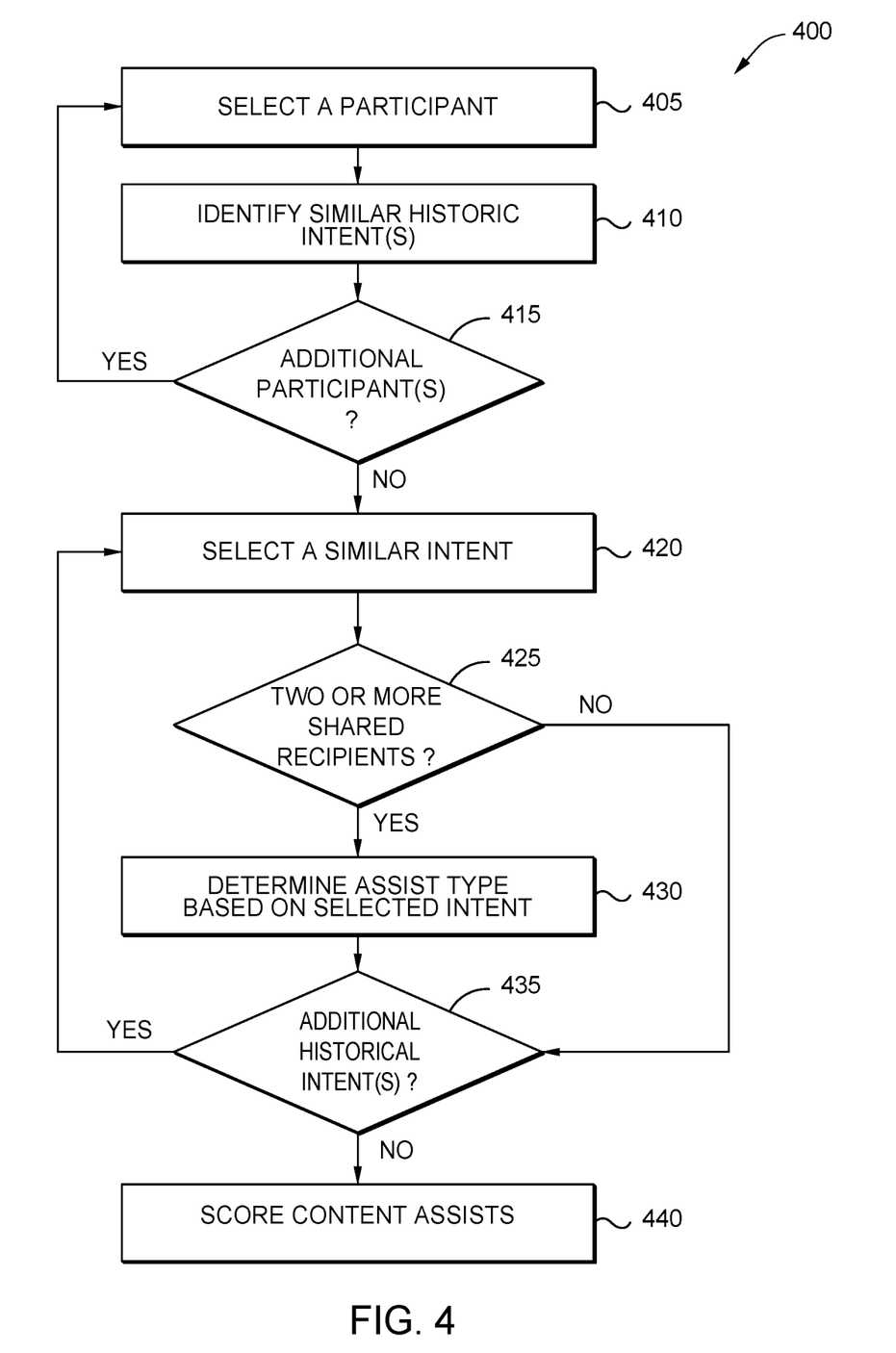
FIG. 4 is a flow diagram illustrating a method for scoring content assists to generate augmented content, according to one embodiment disclosed herein.

FIG. 4 is a flow diagram illustrating a method 400 for scoring content assists to generate augmented content, according to one embodiment disclosed herein. The method 400 begins at block 405, where an Augmentation Application 235 selects a participant in the ongoing conversation. At block 410, the Augmentation Application 235 identifies prior assists (e.g., in the repository of Historic Intents 130) that included or originated with the selected participant, and indicate an intent that is similar to or matches the currently-determined intent. In some embodiments, the Augmentation Application 235 identifies similar intents by matching intents based on the category of intents used in the database table for the activity and intent category (see Table 1, above). Another embodiment for finding similar intent is to evaluate the text similarity between the input text intent and the Historical Intents 135. If the matching has a high threshold for similarity (such as 0.85) and the machine learning confidence of the intent is high, they can be designated as similar or matching intents. In an embodiment, the categorization of intents includes starting with a set of intents (such as ☐Find Document,☐ ☐Link Wiki Page,☐ ☐Share the Specification,☐ ☐Provide Powerpoint,☐ ☐Find Project Plan, ☐, and the like) and linking to the broader category ☐Find Document.☐ This may be curated manually and stored in the data repositories for Historical Intent 130 and Content 135.

The method 400 then proceeds to block 415, where the Augmentation Application 235 determines whether there is at least one additional participant in the conversation (including the originating user and the recipients). If so, the method 400 returns to block 405. Otherwise, the method 400 continues to block 420, where the Augmentation Application 235 selects one of the similar intents that were identified in block 410. At block 425, the Augmentation Application 235 determines whether the selected similar intent overlaps with the current intent being processed, by determining whether there are at least two participants in the current conversation that were part of the selected historical intent. If not, the method 400 proceeds to block 435.

If the selected similar intent overlaps with the current conversation, in terms of participants (e.g., because at least two of the current participants were also involved in the selected similar intent), the method 400 proceeds to block 430, where the Augmentation Application 235 determines an assist type of the selected similar intent. Stated differently, the Augmentation Application 235 determines what type of assist was used (and/or selected by the user) to satisfy the historical intent. In some embodiments, this includes identifying a predefined string, which may have placeholders for content, that can be used to augment the received text from the current conversation. The method 400 then proceeds to block 435.

At block 435, the Augmentation Application 235 determines whether there is at least one additional similar historical intent that has not yet been evaluated. If so, the method 400 returns to block 420. Otherwise, the method 400 continues to block 440, where the Augmentation Application 235 scores the assist types that were determined in block 430. In some embodiments, the score is based at least in part on the number (or percentage) of participants that overlap between the historical intent and the current conversation, where more overlap yields a higher score. In one embodiment, more recent historical intents are assigned relatively higher scores than older intents. Similarly, in an embodiment, historical intents that occurred on the same communication platform as the current conversation are allotted relatively higher scores than intents that occurred on other platforms. Further, in some embodiments, the weighted relevance score for the intent category can be used to determine the assist type, with higher relevance correlating to a score that fits the platform type and aligns with an appropriate assist type. For example, an encoded slack text that produces slack specific output for contact information can be used if the weighted relevance score for the intent of the matching platform is higher. The scoring of assist type can use the platform medium and the correlation of platform capabilities to assist type and historical assist type use in the platform to score whether the assist type should be used.

In an embodiment, the Augmentation Application 235 can then return one or more of the content assists, based on their respective scores. For example, the Augmentation Application 235 may return only the highest-scored assist (or a predefined number of the highest-scoring assists), or only return assists with scores exceeding a predefined threshold. The user may then select one or more of the assists to be used to augment the conversation. In at least one embodiment, the Augmentation Application 235 stores a record of any assist(s) that were selected, creating one or more additional historical intents for subsequent use.

Figure 5:
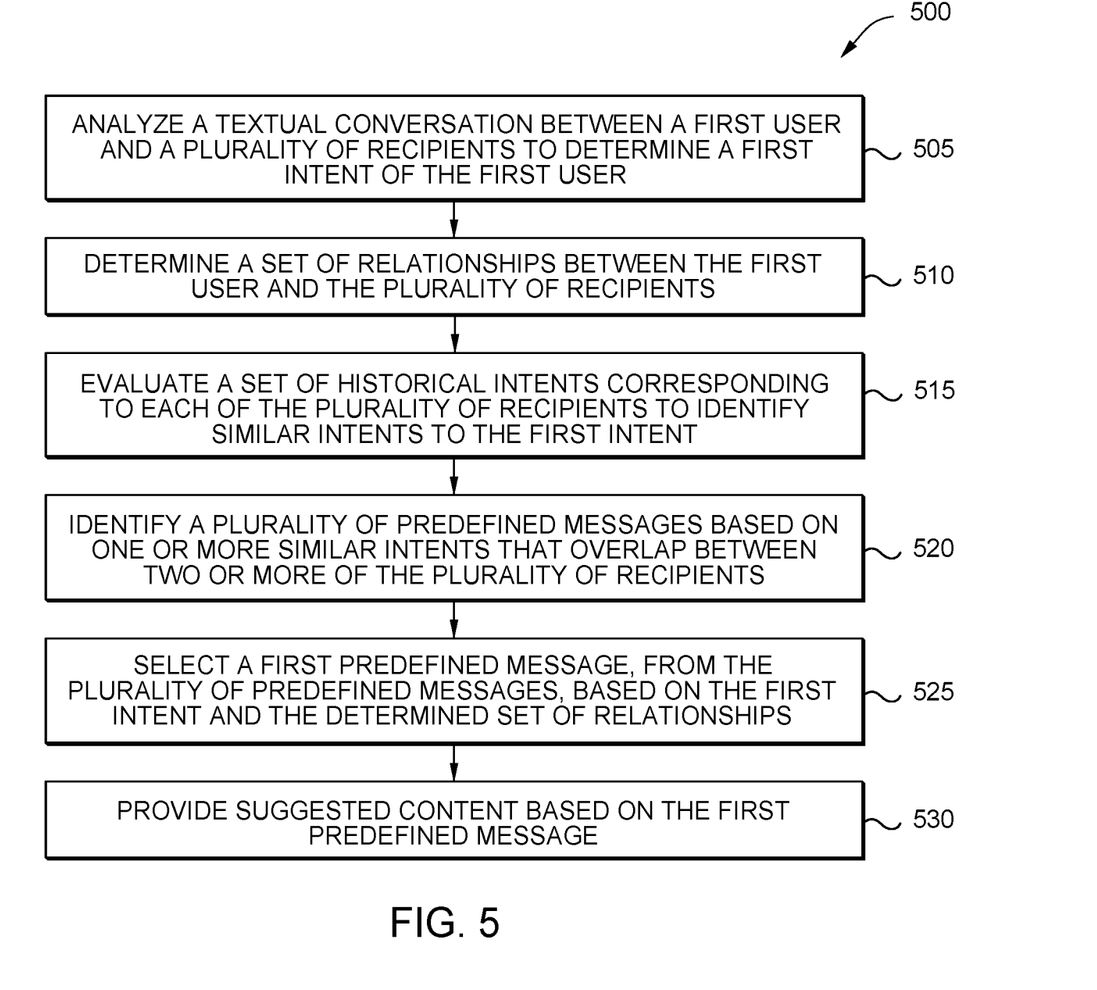
FIG. 5 is a flow diagram illustrating a method for analyzing text to provide augmented content, according to one embodiment disclosed herein.

FIG. 5 is a flow diagram illustrating a method for analyzing text to provide augmented content, according to one embodiment disclosed herein. The method 500 begins at block 505, where an Augmentation Application 235 analyzes a textual conversation between a first user and a plurality of recipients to determine a first intent of the first user. At block 510, the Augmentation Application 235 determines a set of relationships between the first user and the plurality of recipients. The method 500 then continues to block 515, where the Augmentation Application 235 evaluates a set of historical intents corresponding to each of the plurality of recipients to identify similar intents to the first intent. Additionally, at block 520, the Augmentation Application 235 identifies a plurality of predefined messages based on one or more similar intents that overlap between two or more of the plurality of recipients. At block 525, the Augmentation Application 235 selects a first predefined message, from the plurality of predefined messages, based on the first intent and the determined set of relationships. The method 500 then proceeds to block 530, where the Augmentation Application 235 provides suggested content based on the first predefined message.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding and/or following, reference is made to embodiments presented in this disclosure. However, the scope of the present disclosure is not limited to specific described embodiments. Instead, any combination of the preceding and/or following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the preceding and/or following aspects, features, embodiments and advantages are merely illustrative and are not considered elements or limitations of the appended claims except where explicitly recited in a claim(s). Likewise, reference to □the invention□shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a □circuit,□ □module□or □system.□

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user□ computer, partly on the user□ computer, as a stand-alone software package, partly on the user□ computer and partly on a remote computer or entirely on the remote computer or server. In the latter scenario, the remote computer may be connected to the user□ computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in □the cloud,□ without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the Augmentation Application 235) or related data available in the cloud. For example, the Augmentation Application 235 could execute on a computing system in the cloud and evaluate user intent to augment conversations. In such a case, the Augmentation Application 235 could generate content assists and store historical intents and assists at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method, comprising:
analyzing a textual conversation between a first user and a plurality of recipients to determine a first intent of the first user, comprising analyzing a new message being authored by the first user, prior to the new message being transmitted to the plurality of recipients;
determining a set of relationships between the first user and the plurality of recipients;
evaluating a set of historical intents corresponding to each of the plurality of recipients to identify similar intents to the first intent;
identifying a plurality of predefined messages based on one or more similar intents that overlap between two or more of the plurality of recipients;
selecting a first predefined message, from the plurality of predefined messages, based on the first intent and the determined set of relationships, wherein the predefined message comprises a natural language string with one or more placeholders to insert personalized data; and
providing suggested content based on the first predefined message, comprising:
inserting the first predefined message into the new message; and
transmitting the new message to the plurality of recipients as part of the textual conversation.

2. The method of claim 1, wherein analyzing the textual conversation comprises using one or more natural language understanding (NLU) techniques to analyze text included in a most recent message of the textual conversation.

3. The method of claim 2, the method further comprising:
selecting a first type of content assist based the first intent, wherein identifying the plurality of predefined messages is based further on the first type of content assist.

4. The method of claim 1, the method further comprising:
storing an indication of the first intent in the set of historical intents, along with an indication of the plurality of recipients.

5. The method of claim 4, wherein the stored indication of the first intent includes a link to a separate secure repository containing at least a portion of the textual conversation.

6. The method of claim 1, wherein the suggested content includes a plurality of data items, the method further comprising:
receiving, from the first user, a selection of a first data item of the plurality of data items;
replacing at least one of the one or more placeholders in the predefined message with the first data item; and
transmitting the new message, along with the first data item, to the plurality of recipients as part of the textual conversation.

7. The method of claim 1, wherein identifying the plurality of predefined messages comprises, for each respective intent of the one or more similar intents that overlap between two or more of the plurality of recipients:
searching a database based on the respective intent to identify one or more predefined messages, wherein each of the one or more predefined messages comprise text and one or more placeholders for data items; and
scoring the one or more predefined messages based on a similarity score between the respective intent and the first intent.

8. A computer-readable storage medium containing computer program code that, when executed by operation of one or more computer processors, performs an operation comprising:
analyzing a textual conversation between a first user and a plurality of recipients to determine a first intent of the first user, comprising analyzing a new message being authored by the first user, prior to the new message being transmitted to the plurality of recipients;
determining a set of relationships between the first user and the plurality of recipients;
evaluating a set of historical intents corresponding to each of the plurality of recipients to identify similar intents to the first intent;
identifying a plurality of predefined messages based on one or more similar intents that overlap between two or more of the plurality of recipients;

selecting a first predefined message, from the plurality of predefined messages, based on the first intent and the determined set of relationships, wherein the predefined message comprises a natural language string with one or more placeholders to insert personalized data; and providing suggested content based on the first predefined message, comprising:
inserting the first predefined message into the new message; and
transmitting the new message to the plurality of recipients as part of the textual conversation.

9. The computer-readable storage medium of claim 8, wherein analyzing the textual conversation comprises using one or more natural language understanding (NLU) techniques to analyze text included in a most recent message of the textual conversation.

10. The computer-readable storage medium of claim 9, the operation further comprising:
selecting a first type of content assist based the first intent, wherein identifying the plurality of predefined messages is based further on the first type of content assist.

11. The computer-readable storage medium of claim 8, the operation further comprising:
storing an indication of the first intent in the set of historical intents, along with an indication of the plurality of recipients.

12. The computer-readable storage medium of claim 11, wherein the stored indication of the first intent includes a link to a separate secure repository containing at least a portion of the textual conversation.

13. The computer-readable storage medium of claim 8, wherein the suggested content includes a plurality of data items, the operation further comprising:
receiving, from the first user, a selection of a first data item of the plurality of data items;
replacing at least one of the one or more placeholders in the predefined message with the first data item; and
transmitting the new message, along with the first data item, to the plurality of recipients as part of the textual conversation.

14. The computer-readable storage medium of claim 8, wherein identifying the plurality of predefined messages comprises, for each respective intent of the one or more similar intents that overlap between two or more of the plurality of recipients:
searching a database based on the respective intent to identify one or more predefined messages, wherein each of the one or more predefined messages comprise text and one or more placeholders for data items; and
scoring the one or more predefined messages based on a similarity score between the respective intent and the first intent.

15. A system comprising:
one or more computer processors; and
a memory containing a program which when executed by the one or more computer processors performs an operation, the operation comprising:
analyzing a textual conversation between a first user and a plurality of recipients to determine a first intent of the first user, comprising analyzing a new message being authored by the first user, prior to the new message being transmitted to the plurality of recipients;
determining a set of relationships between the first user and the plurality of recipients;
evaluating a set of historical intents corresponding to each of the plurality of recipients to identify similar intents to the first intent;
identifying a plurality of predefined messages based on one or more similar intents that overlap between two or more of the plurality of recipients;
selecting a first predefined message, from the plurality of predefined messages, based on the first intent and the determined set of relationships, wherein the predefined message comprises a natural language string with one or more placeholders to insert personalized data; and
providing suggested content based on the first predefined message, comprising:
inserting the first predefined message into the new message; and
transmitting the new message to the plurality of recipients as part of the textual conversation.

16. The system of claim 15, wherein analyzing the textual conversation comprises using one or more natural language understanding (NLU) techniques to analyze text included in a most recent message of the textual conversation.

17. The system of claim 15, the operation further comprising: selecting a first type of content assist based the first intent, wherein identifying the plurality of predefined messages is based further on the first type of content assist.

18. The system of claim 16, the operation further comprising:
storing an indication of the first intent in the set of historical intents, along with an indication of the plurality of recipients, wherein the stored indication of the first intent includes a link to a separate secure repository containing at least a portion of the textual conversation.

19. The system of claim 16, wherein the suggested content includes a plurality of data items, the operation further comprising:
receiving, from the first user, a selection of a first data item of the plurality of data items;
replacing at least one of the one or more placeholders in the predefined message with the first data item; and
transmitting the new message, along with the first data item, to the plurality of recipients as part of the textual conversation.

20. The system of claim 16, wherein identifying the plurality of predefined messages comprises, for each respective intent of the one or more similar intents that overlap between two or more of the plurality of recipients:
searching a database based on the respective intent to identify one or more predefined messages, wherein each of the one or more predefined messages comprise text and one or more placeholders for data items; and
scoring the one or more predefined messages based on a similarity score between the respective intent and the first intent.

* * * * *